Dec. 10, 1968 R. L. OLIN 3,415,400
HAYSTACK MOVER
Filed May 4, 1966 3 Sheets-Sheet 2

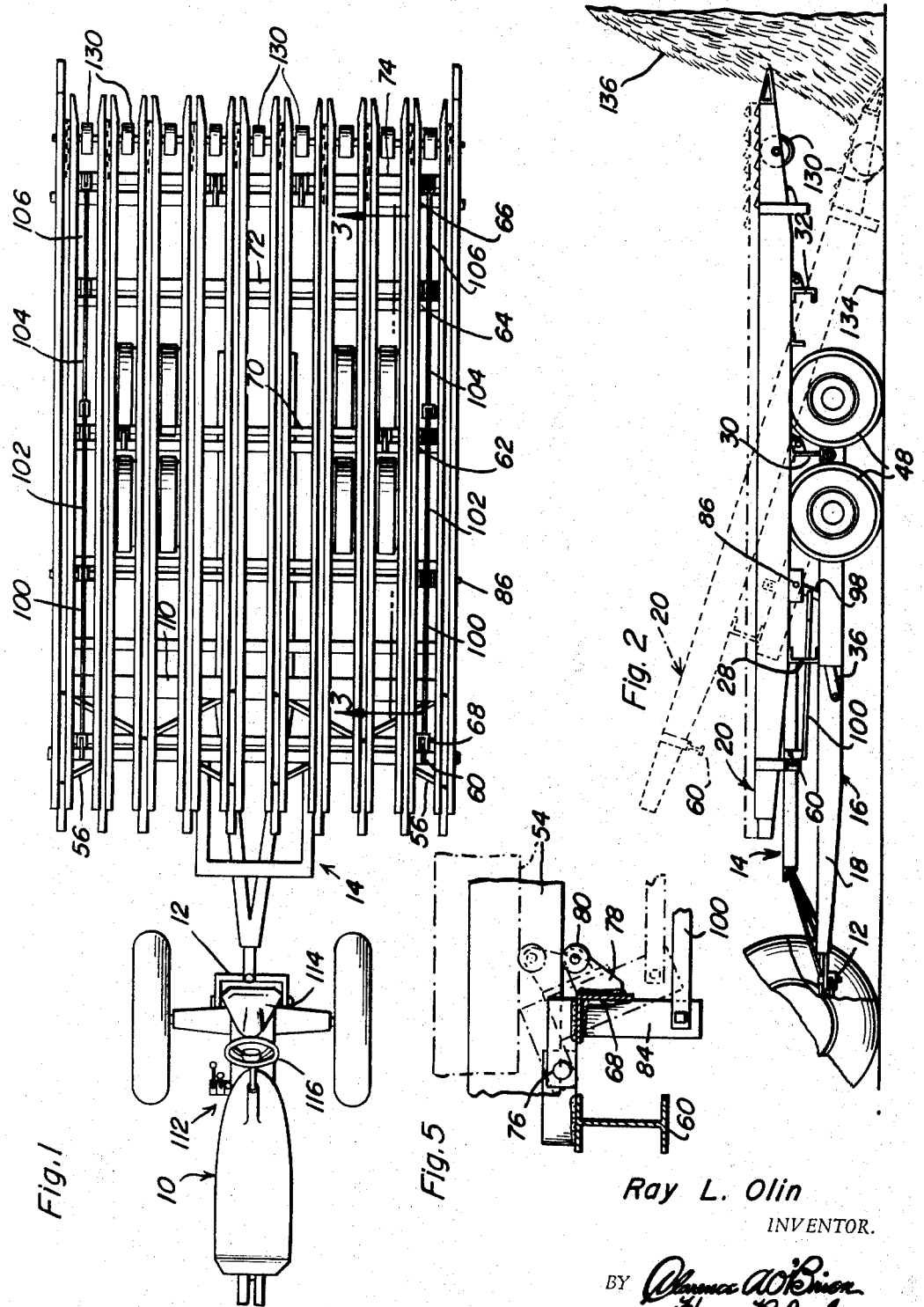

Ray L. Olin
INVENTOR.

BY *Clarence A O'Brien*
*and Harvey B. Jacobson*
Attorneys

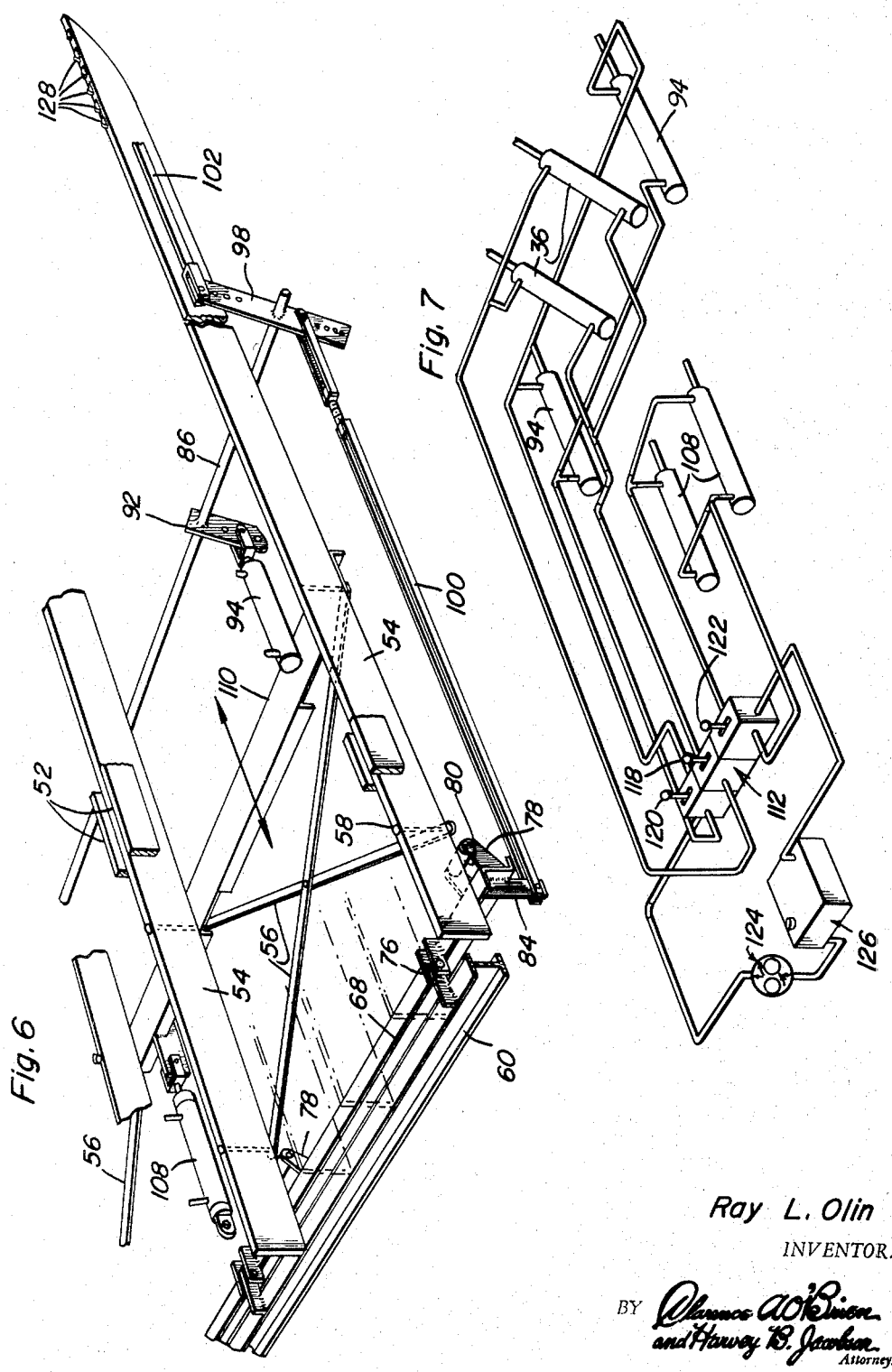

United States Patent Office 3,415,400
Patented Dec. 10, 1968

3,415,400
HAYSTACK MOVER
Ray L. Olin, Almont, N. Dak. 58520
Filed May 4, 1966, Ser. No. 547,628
6 Claims. (Cl. 214—505)

ABSTRACT OF THE DISCLOSURE

A haystack mover in the form of a wagon with wheels adapted to be connected to a tractor and towed thereby with fluid power from the tractor operable to actuate the actuators on the haystack mover. The wagon includes a main frame having the wheeled supports and a support frame pivotally mounted thereon which is tiltable relative to the main frame to an inclined position such that it may be moved underneath the stack. Portions of the support frame include lifting and moving members which are guided between fixed supports and elevatable above and below the height of the fixed supports and movable longitudinal thereof through separate actuators such that the elevating and longitudinal movements may be separated and independently controlled. The support frame is similarly moved to tilt relative to the main frame through a separate actuator.

---

This invention relates to a novel and useful haystack loader and mover and more specifically to a trailer-type of vehicle adapted to be towed behind a farm tractor or the like and to be utilized in picking up and transporting a haystack. Although the haystack loader and mover is specifically illustrated and described herein as being in the form of a wheeled trailer, it is to be understood that any wheeled means may be utilized as a support for the tiltable support frame.

The haystack mover of the instant invention includes a tiltable wheeled support frame including elongated longitudinally extending and transversely spaced pairs of side-by-side support members spaced slightly apart and a plurality of elongated and transversely spaced lifting and moving members disposed between the support members of each pair of support members. The lifting and moving members are supported from the support frame for simultaneous reciprocal movement longitudinally of the support frame and for simultaneous height adjustment of the lifting and moving members between lowered positions with their upper surfaces disposed below the upper surfaces of the support members and raised positions with their upper surfaces disposed above the upper surfaces of the support members. Further, means is provided and supported from the support frame and operatively connected to the lifting and moving members for selectively shifting the latter longitudinally of the support frame and second means is also provided and operatively connected between the support frame and the lifting and moving members for varying the height thereof between the raised and lowered positions thereof. Still further, the first and second means provided for longitudinally shifting the lifting and moving members relative to the support frame and to vary the height of the lifting and moving members between their raised and lowered positions, respectively, are operative independently of each other.

Conveyor assemblies have ben heretofore designed including parallel elongated support members and lifting and moving members such as those referred to above. Further, these previously known conveyors or conveyor assemblies have included means for sequentially lifting the lifting and moving members, longitudinally shifting the lifting and moving members, lowering the lifting and moving members, and then longitudinally shifting the lifting and moving members in the opposite direction prior to their again being raised or elevated, whereby a load supported from the conveyor assembly may be conveyed step by step therealong. However, such conveyors have included driving mechanisms whereby the above-mentioned sequential steps are automatically carried out and the longitudinal shifting and raising and lowering operation of the lifting and moving members may be accomplished only by shifting the lifting and moving members predetermined distances. Further, this type of conveyor assembly or mechanism has heretofore not been successfully applied to a tiltable load bed of a trailer specifically designed for lifting and moving haystacks or similar loads requiring particular handling.

Accordingly, it is the main object of this invention to provide a haystack loader and mover of the vehicular type and designed specifically to be capable of efficiently loading a haystack thereon, transporting the haystack to a different location, and unloading the haystack therefrom.

Another object of this invention, in accordance with the immediate preceding object, is to provide a haystack mover constructed in a manner whereby the haystack supported thereon may be partially unloaded therefrom while the mover is in motion.

A further object of this invention is to provide a haystack mover including a conveyor assembly such as that referred to above but which is constructed in a manner whereby the sequential steps may be initiated individually by the operator at his discretion and the distances the lifting and moving members are lifted and shifted longitudinally may be varied by the operator.

Still another object of this invention is to provide a haystack mover in accordance with the preceding objects that will be capable of loading and transporting a haystack thereon in a manner such that the haystack may be transported from one location to another and then unloaded from the mover without excessively disturbing the haystack.

A final object of this invention to be specifically enumerated herein is to provide a haystack mover in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the haystack mover of the instant invention shown operatively connected to a farm tractor for trailing behind the latter;

FIGURE 2 is a side elevational view of the embodiment illustrated in FIGURE 1 with portions of the tractor being broken away and an alternate position of the tiltable support frame of the mover illustrated in phantom lines;

FIGURE 5 is an enlarged fragmentary longitudinal vertical sectional view illustrating the manner in which the lifting and moving members of the haystack mover may be vertically shifted and also the manner in which the lifting and moving members are supported for guided longitudinal reciprocation;

Figure 3:
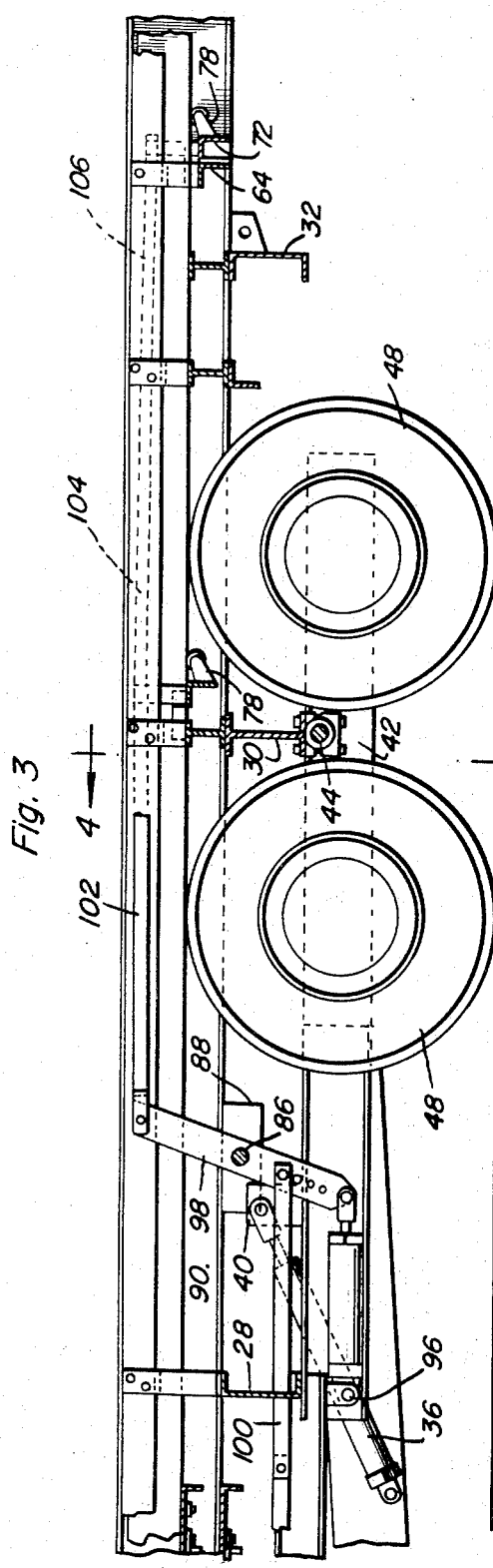
FIGURE 3 is an enlarged fragmentary longitudinal vertical sectional view taken substantially upon the plane indicated by the section line 3—3 of FIGURE 1.

FIGURE 6 is a fragmentary perspective view of certain selected portions of the tiltable support frame of the haystack mover illustrating in part the manner in which the lifting and moving members may be simultaneously lifted and lowered as well as longitudinally shifted; and FIGURE 7 is a diagrammatical perspective view of the hydraulic system of the haystack mover illustrating the manner in which the various extendible fluid motors thereof are operatively connected to the hydraulic pump carried by the associated tractor and controlled by means of suitable controls also supported from the tractor.

Referring now more specifically to the drawings, the numeral 10 generally designates a conventional form of farm tractor having a towing hitch 12 secured to the rear portion thereof.

The haystack mover of the instant invention is generally referred to by the reference numeral 14 and includes a wheeled main frame generally referred to by the reference numeral 16 and including a forwardly projecting tongue portion 18 which is suitably connected to the hitch 12.

A support frame generally referred to by the reference numeral 20 and including a pair of longitudinal members 24 and 26 interconnected by means of transverse members 28, 30 and 32 is pivotally supported from the main frame 16 by means of pivot pins 34.

A pair of extendible fluid motors 36 are pivotally interconnected between corresponding longitudinal members 38 of the main frame 16 and anchor brackets 40 carried by the longitudinal members 24 and 26 of the support frame 20. In this manner, the support frame 20 may be pivoted relative to the main frame 16 between the solid line and the dotted line positions of FIGURE 2.

A pair of walking beams 42 are pivotally supported from opposite end portions of the transverse member or beam 30 by means of pivot shafts 44 and each end of each walking beam 42 rotatably journals therefrom a dual wheel assembly 46 includes a pair of wheels 48 and 50 disposed on opposite sides of the corresponding walking beam 42.

The support frame 20 includes pairs of parallel closely spaced, elongated and longitudinally extending support members 52 supported from and extending over the transverse beams 28, 30 and 32 and spaced transversely of the support frame 20. An elongated and longitudinally extending lifting and moving member 54 is disposed between each pair of support members and the lifting and moving members 54 are interconnected by means of crossed brace members 56 secured to each of the lifting and moving members 54 by means of suitable fasteners 58 for simultaneous reciprocation of the lifting and moving members 54 longitudinally of the support frame 20.

The support frame 20 also includes transverse members or beams 60, 62, 64 and 66 from which lifting beams 68, 70, 72 and 74 are pivotally supported by means of pivot assemblies such as pivot assembly 76 illustrated in FIGURE 6.

Each of the beams 68, 70, 72 and 74 includes a plurality of roller support assemblies such as roller support assembly 78, see FIGURE 6, spaced longitudinally therealong and including rollers 80 journalled therefrom for rotation about axes generally paralleling the corresponding beams 60, 62, 64 and 66.

The lifting and moving members 54 are panel-like in configuration and project below the lower edge portions of the corresponding support members 52. The lower marginal edge portions of the lifting and moving members 54, when the latter are in their lowermost positions, rest upon the upper surfaces of the beams 60, 62, 64 and 66 but rest upon and are elevated by the rollers 80 disposed therebeneath when the beams 68, 70, 72 and 74 are pivoted from the solid line in operative positions illustrated in FIGURE 5 of the drawings to the operative dotted line position illustrated in FIGURE 5 of the drawings.

The opposite ends of each of the beams 68, 70, 72 and 74 include depending crank arm portions 84. An operating shaft 86 extending transversely of the support frame 20 is journalled from the latter intermediate its opposite ends by means of journal blocks 88 dependingly supported from longitudinal members 90 of the support frame 20. Central portions of the operating shaft 86 include crank arms 92, see FIGURE 6, and the free end of the crank arms 92 each have one end of a corresponding extendible fluid motor 94 secured thereto. The other end of each fluid motor 94 is pivotally supported from the support frame 20 as at 96. In addition, the opposite end portions of the operating shaft 86 are provided with transverse operating arms 98 and the operating arms 98 include upper and lower end portions. A pair of longitudinally adjustable connecting rod members 100 have their forward ends pivotally connected to the lower ends of the crank arms 84 carried by the beam 68 and their rear ends pivotally connected to the lower end portions of the operating arms 98. In addition, the upper end of each operating arm 98 has the forward end of a connecting rod assembly 102 pivotally secured thereto and the rear end of each connecting rod assembly 102 is pivotally secured to the lower end portion of the corresponding crank arm 84 carried by the beam 70. Further, additional connecting rod assemblies 104 and 106, see FIGURE 1, are provided on each side of the support frame 20 and interconnect the lower ends of the crank arms 84 carried by the beams 70 and 72 and the beams 72 and 74, respectively.

Figure 4:
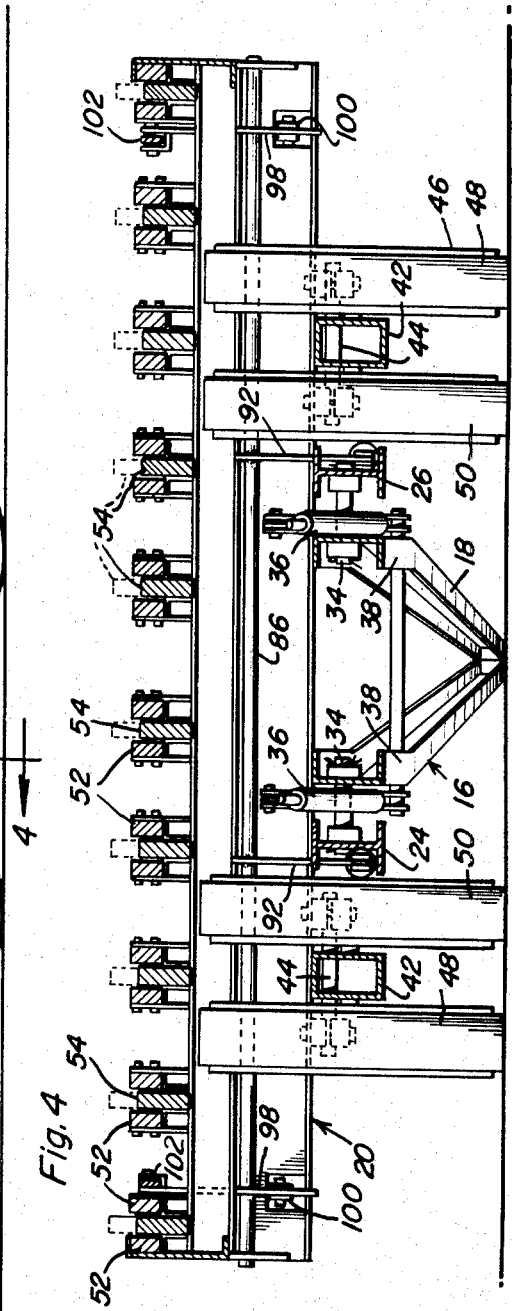
FIGURE 4 is a transverse vertical sectional view taken substantially upon the plane indicated by the section line 4—4 of FIGURE 3.

Accordingly, upon actuation of the fluid motors 94, the rollers 80 may be shifted between the raised and lowered positions illustrated in phantom and solid lines, respectively, in FIGURE 5 of the drawings in order to simultaneously raise and lower the lifting and moving members 54 between the phantom and solid line positions thereof illustrated in FIGURE 4.

A pair of fluid motors 108 are pivotally interconnected between opposite side portions of the support frame 20 and the assembly comprising the lifting and moving members 54, the diagonal bracing members 56, and the transverse brace member 110, see FIGURE 6, which is also secured to and interconnects the lifting and moving members 54. In this manner, the above-mentioned assembly may be readily longitudinally reciprocated independently of vertical adjustment and vice versa.

The tractor 10 includes a suitable hydraulic control valve assembly generally referred to by the reference numeral 112 and positioned adjacent the driver's seat 114 and the steering wheel 116 of the tractor 10 and the valve operators 118, 120 and 122 of the assembly 112 may be manipulated to extend and retract the fluid motors 36, 94 and 108, respectively. It is of course to be understood that the tractor 10 includes a suitable driven hydraulic pump assembly generally referred to by the reference numeral 124 with which the control valve assembly 112 is operatively associated and a fluid reservoir assembly generally referred to by the reference numeral 126 to which the various fluid motors 36, 94 and 108 may be vented by actuation of the corresponding valve actuators or controls 118, 120 and 122.

The upper edge portions of the rear ends of the lifting and moving members 54 are provided with upwardly projecting and longitudinally spaced teeth 128 for frictionally gripping the haystack under which the rear ends of the lifting and moving members 54 are forced. Further, a plurality of ground-engaging support wheels 130 are journaled between the rear ends of adjacent pairs of support members 52 and project below the lower surface portions of the support members 52 and the lifting and moving members 54 for engagement with the ground 134 on which the hastack mover 14 and the haystack 136 to be moved are disposed.

In operation, the support frame 20 is first tilted to the phantom line position illustrated in FIGURE 2 of the drawings. Then, the tractor 10 may be moved in a reverse direction to force the rear ends of the support members 52 and the lifting and moving members 54 beneath at least the adjacent portion of the haystack 136. Then, the support and lifting members 54 may be raised to receive thereon the portion of the haystack disposed thereover by extension of the fluid motors 94. Thereafter, the lifting and moving members 54 may be longitudinally shifted forwardly along the support frame 20 by collapsing the fluid motors 108 while at the same time the tractor 10 is moved slightly rearwardly toward the haystack 136. In this manner, the portions of the haystack supported by the lifting and moving members 54 are merely lifted during rearward movement of the support members 52 thereunder. Then, the lifting and moving members 54 may be lowered so as to transfer the load of the haystack 136 back to the support members 52. Thereafter, the fluid motors 108 may be extended to rearwardly shift the lifting and moving members 54 rearwardly further beneath the haystack 136 while the latter is supported from the support members 52. Then, the lifting and moving members 54 may again be raised to lift the haystack 36 above the support members 52 and thereafter the tractor 10 may be moved rearwardly while the fluid motors 108 are collapsed to again shift the lifting and moving members 54 longitudinally forwardly along the frame 20 thereby enabling the lifting and moving members 54 to remain stationary relative to the bottom of the haystack 136 while the support members 52 are moved still further beneath the haystack 136. The above operation is of course repeated until the support frame 20 is positioned beneath at least a substantial portion of the haystack 136 at which time the support frame 20 may be tilted from the phantom line position illustrated in FIGURE 2 of the drawings to the solid line position illustrated in FIGURE 2 by collapsing the fluid motors 36. After the support frame 20 has been returned to its horizontally disposed position, the haystack 136 may be moved further forwardly along the support frame 20 merely by raising the lifting and moving members 54 shifting them forwardly and then lowering the lifting and moving members 54 and shifting them rearwardly in preparation to their again being lifted.

Of course, the above operation may be reversed if it is desired to unload the haystack 136 from the haystack mover 14 with the haystack 136 substantially intact. Additionally, should it be desired to spread the haystack 136 out as it is unloaded from the haystack mover 14, the support frame 20 may be tilted from the horizontal position to the inclined position while the haystack mover 14 is moving over the ground 134.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A haystack mover comprising, a wheeled main frame, a support frame pivotally mounted thereon for tilting movement, said support frame including elongated longitudinally extending and transversely spaced fixed support members, a plurality of elongated and transversely spaced lifting and moving members disposed between adjacent support members and supported from said support frame for simultaneous reciprocal movement longitudinally of said support frame and for simultaneous height adjustment of said lifting and moving members between lowered positions with their upper surfaces disposed below the upper surfaces of said support members and raised positions with their upper surfaces disposed above the upper surfaces of said support members, said lifting and moving members being snugly disposed between pairs of adjacent support members throughout their vertical movement relative to the latter and guided thereby against excessive lateral movement relative to said support frame, first means supported from said support frame and operatively connected to said lifting and moving members for selectively shifting the latter longitudinally of said support frame while in raised and lowered positions, second means supported from said support frame and operative to vary the height of said lifting and moving members between said raised and lowered positions, said second means includes roller means supported from and vertically shiftable relative to said support frame from which said lifting and moving members are rollingly supported at points spaced longitudinally therealong, a third means operatively connected between the main frame and the support frame for tilting the support frame relative to the main frame.

2. The haystack mover of claim 1 in which the said first, second and third means are independent actuators operable independent of one another.

3. The haystack mover of claim 2 in which the actuators comprising the first, second and third means are fluid motors and include the separate control means and fluid connections adapted to be connected to a source of fluid under pressure.

4. A haystack mover comprising a tiltable wheeled support frame including elongated longitudinally extending and transversely spaced fixed support members, a plurality of elongated and transversely spaced lifting and moving members disposed between adjacent support members and supported from said support frame and simultaneous reciprocal movement longitudinally of said support frame and for simultaneous height adjustment of said lifting and moving members between lowered positions with their upper surfaces disposed below the upper surfaces of said support members and raised positions with their upper surfaces disposed above the upper surfaces of said support members, first means supported from said support frame and operatively connected to said lifting and moving members for selectively shifting the latter longitudinally of said support frame while in raised and lowered positions, and second means supported from said support frame and operative to vary the height of said lifting and moving members between said raised and lowered positions, said lifting and moving members being snugly disposed between pairs of adjacent support members throughout their vertical movement relative to the latter and guided thereby against excessive lateral movement relative to said frame, said second means including roller means supported from and vertically shiftable relative to said support frame from which said lifting and moving members are rollingly supported at points spaced longitudinally therealong, said roller means including rollers journaled from one set of corresponding ends of arm members whose other set of corresponding ends are pivotally supported from said support.

5. The haystack mover of claim 4 and including a main frame, said support frame being pivotally mounted on and supported by said main frame for pivotal movement thereon about an axis extending transversely of said elongated members, said main frame being wheeled for rolling movement along a supporting surface in a direction extending laterally of said axis.

6. The haystack mover of claim 5 and including actuator means connected between the support frame and said main frame and being operative to adjustably pivot the support frame relative to the main frame.

References Cited
UNITED STATES PATENTS

| | | |
|---|---|---|
| 1,811,339 | 6/1931 | De Bije. |
| 2,622,401 | 12/1952 | Drago _____ 198—219 XR |
| 2,973,856 | 3/1961 | Brooks _____ 214—83.3 XR |
| 3,161,284 | 12/1964 | Ashworth _____ 198—219 |
| 3,221,870 | 12/1965 | Pagay _____ 198—219 |
| 3,298,550 | 1/1967 | Schlitz _____ 214—505 |

ALBERT J. MAKAY, *Primary Examiner.*

U.S. Cl. X.R.

198—219; 56—362